United States Patent
Rushton et al.

(10) Patent No.: US 11,779,020 B2
(45) Date of Patent: Oct. 10, 2023

(54) HONEY-BASED ROOTING GEL COMPOSITION AND METHOD OF PREPARING THE SAME

(71) Applicant: LPC Naturals, LLC, Williamsville, NY (US)

(72) Inventors: Paul J. Rushton, Buffalo, NY (US); Nicholas E. Bianco, Lancaster, NY (US); Christopher J. Lent, Lancaster, NY (US); Todd H. Young, Lafayette, CO (US)

(73) Assignee: LPC Naturals, LLC, Williamsville, NY (US)

( * ) Notice: Subject to any disclaimer, the term of this patent is extended or adjusted under 35 U.S.C. 154(b) by 0 days.

(21) Appl. No.: 17/691,735

(22) Filed: Mar. 10, 2022

(65) Prior Publication Data

US 2022/0287311 A1 Sep. 15, 2022

Related U.S. Application Data

(60) Provisional application No. 63/159,775, filed on Mar. 11, 2021.

(51) Int. Cl.
| | | |
|---|---|---|
| *A01N 63/14* | (2020.01) | |
| *A01N 63/38* | (2020.01) | |
| *A01N 63/30* | (2020.01) | |
| *A01P 21/00* | (2006.01) | |
| *A01N 43/38* | (2006.01) | |
| *A01N 65/08* | (2009.01) | |

(52) U.S. Cl.
CPC .............. *A01N 63/14* (2020.01); *A01N 43/38* (2013.01); *A01N 63/30* (2020.01); *A01N 63/38* (2020.01); *A01N 65/08* (2013.01); *A01P 21/00* (2021.08)

(58) Field of Classification Search
CPC ........ A01N 63/14; A01N 63/38; A01N 63/30; A01N 43/38; A01N 65/08; A01P 21/00
See application file for complete search history.

(56) References Cited

U.S. PATENT DOCUMENTS

| | | |
|---|---|---|
| 4,297,125 A | 10/1981 | Haissig et al. |
| 5,143,536 A | 9/1992 | Runkis |
| 5,164,310 A | 11/1992 | Smith et al. |
| 5,276,005 A | 1/1994 | Lorina et al. |
| 5,629,468 A | 5/1997 | Schwarz et al. |
| 7,429,691 B2 | 9/2008 | Zhang et al. |
| 8,486,863 B2 | 7/2013 | Audenaert et al. |
| 10,287,604 B2 | 5/2019 | Kondo et al. |

OTHER PUBLICATIONS

Waddington. 2021. 9 Interesting Uses for Honey in Your Garden. Rural Sprout website—https://www.ruralsprout.com/honey-in-garden/#:~:text=%209%20Interesting%20Uses%20for%20Honey%20in%20Your,plants%20a%20boost%20with%20this%20easy-to-make . . . %20More%20 (Year: 2021).*

Cloning and Rooting. 2019. 8 natural rooting stimulants for cloning plants in gardening, https://www.gkvks.com/8-natural-rooting-stimulants-for-cloning-plants-in-gardening/) (Year: 2019).*

Akello et al. 2007. Beauveria bassiana (Balsamo) Vuillemin as an endophyte in tissue culture banana (*Musa* spp.). Journal of Invertebrate Pathology 96: 34-42 (Year: 2007).*

Anand et al. 2019. Agastache honey has superior antifungal activity in comparison with important commercial honeys. Scientific reports 9:18197 (Year: 2019).*

* cited by examiner

*Primary Examiner* — Karen M Redden

(74) *Attorney, Agent, or Firm* — Vincent Lotempio

(57) ABSTRACT

A honey-based rooting gel composition and method of preparing the same are disclosed. The honey-based rooting gel composition comprises honey and symbiotic fungi such as *Beauveria bassiana* or *Trichoderma koningii* which increases plant growth and health, and may also contain a plant rooting hormone such as Indole-3-butyric acid (IBA) or other plant rooting hormones that promote root initiation, or natural rooting substances such as willow bark extracts that promote root growth. The use of honey provides an unexpected synergy to protect the cuttings from pathogens through the antibacterial and anti-fungal properties of the honey and benefits both plant and fungal growth by providing growth-promoting carbohydrates (mainly fructose and glucose) for both the plant and the germinating fungal spores. Further, the honey-based rooting gel composition simultaneously induces roots in cuttings to produce new plants and infects the new plants with beneficial symbiotic fungi that improve various properties of the growing plants.

6 Claims, 2 Drawing Sheets

HONEY-BASED ROOTING GEL COMPOSITION AND METHOD OF PREPARING THE SAME

CROSS-REFERENCE TO RELATED APPLICATIONS

This application claims priority to a U.S. Provisional Application No. 63/159,775, filed Mar. 11, 2021, which is hereby incorporated by reference in its entirety.

FIELD OF INVENTION

The present invention generally relates to a honey based rooting gel composition and method of manufacture. More particularly, the present invention relates to a rooting gel that simultaneously induces root formation and establishes beneficial symbioses with one or more beneficial symbiotic fungi. The honey based rooting gel includes honey and symbiotic fungi, and may also include either a plant rooting hormone Indole-3-butyric acid (IBA) or other plant hormones that promote root initiation, or natural rooting substances, such as willow bark extracts, useful for promoting root growth. Some plant species naturally produce roots at high levels and in these cases the plant rooting hormone can be omitted from the invention.

BACKGROUND OF INVENTION

Plants are frequently propagated for reproducing plants from a parent plant or existing plant. There are several propagation techniques available such as division, budding, grafting, and cutting. Among them, cutting (also called cloning) is the most popular technique adopted by many. The plant cut by cutting technique is then placed in a growth medium such as water or soil. During propagation, the cut plant can be applied with rooting gels to induce root formation before placing them in the soil for proper growth.

Typically, the rooting gels are used for the development of the cut plant into independent plants with functioning root systems. Many of these rooting gels contain auxins such as Indole-3-butyric acid (IBA) to promote the initiation and growth of new roots from the cut site. It is known in the art that cuttings from many species of plants are difficult to root because they do not respond well to known formulations of auxins (Audus, supra). Mature trees, in general, are difficult to propagate economically. In many instances, to perform a cloning process, rooting hormones are used. However, these do not always have efficacious results for proper plant growth and root formation.

Several attempts have been made in the past to address the problems presented above. One such example is disclosed in a U.S. Pat. No. 5,629,468, entitled "Root stimulating bacteria" ("the '468 patent"). The '468 patent discloses a bacterium which stimulates root production, or an extract in which the bacteria had been growing, is contacted to a portion of a plant other than a root. The root stimulating bacteria (RSB) or the extract induces the formation of roots in the plant. The RSB is well suited for inducing rooting in difficult to root species such as conifers of the *Pinus* genus. The RSB, the extract, the medium in which the RSB grows, the method for use of the RSB or the extract to induce rooting, and the plants treated with the RSB or the extract comprise the current invention.

Another example is disclosed in a U.S. Pat. No. 5,143,536, entitled "Gel rooting composition and method" ("the '536 patent"). The '536 patent discloses a rooting composition comprising a water-swellable gel containing auxin in an amount effective to stimulate root growth, the gel comprising a high molecular weight organic acid, ketone, or ester or combinations thereof. Root formation from a cutting is stimulated by planting the cutting in the soil with the aforementioned rooting composition adhered to the portion of the cutting proximal where it was cut from a living plant. The auxins are maintained close to the cutting whereby they are highly effective and the gel serves as an artificial root to bring water and nutrients to the cutting as it develops its own root system.

Yet another example is disclosed in a U.S. Pat. No. 8,486,863, entitled "Activators of lateral root formation" ("the '863 patent"). The '863 patent discloses activators of lateral root formation. In this prior art, small chemical compounds that act as activators of lateral root formation in plants. More specifically, small chemical compounds are structurally not related to auxin but do have a similar effect on root density development in plants. Preferably, these compounds act more specifically on root development than auxin, and may have a different working mechanism.

Yet another example is disclosed in a U.S. Pat. No. 4,297,125, entitled "Tree rooting using synthetic auxins" ("the '125 patent"). The '125 patent discloses tree rooting using synthetic auxins. Aryl esters of auxins, such as phenyl indole-3-butyrate, are found to significantly improve the initiation of rooting of cuttings in difficult-to-root species, such as *pinus*.

Yet another example is disclosed in a U.S. Pat. No. 5,276,005, entitled "Method of and root and systemic herbal treatment for improving the growth and/or yield of plants" ("the '005 patent"). The '005 patent discloses an herbal treatment for plant growth comprising a water solution of extracts of the type withdrawn at elevated temperature from Artemesia plants and the like, applicable to the root structure of plants and as an external spray.

Yet another example is disclosed in a U.S. Pat. No. 5,229,114, entitled "Approaches useful for the control of root nodulation of leguminous plants" ("the '114 patent"). The '114 Patent discloses an approach for the increased dinitrogen fixation of leguminous plants wherein the root nodulation of the leguminous plant is controlled so as to promote nodulation by a desired bradyrhizobial strain and to inhibit nodulation of an undesired bradyrhizobial strain.

Although the above-mentioned disclosures disclose various formulations and ingredients for preparing synthetic gel-based compositions, none of them teaches a honey-based plant rooting gel that simultaneously induces root formation and establishes beneficial symbioses with one or more beneficial symbiotic fungi.

Therefore, there is a need in the art to provide a composition that simultaneously induces root formation and establishes beneficial symbioses with one or more beneficial symbiotic fungi. Also, there is a need for a composition and method for improving various properties of the growing plants. Further, there is a need for a composition and method to simultaneously induce roots in cuttings to produce new plants and infect the new plants with beneficial symbiotic fungi.

SUMMARY OF THE INVENTION

It is an object of the present invention to provide a honey-based rooting gel composition configured to simultaneously enhance root growth and establish beneficial symbiosis and a method for producing the same.

It is another object of the present invention to provide a method of preparing the honey-based rooting gel composition for improving various properties of the growing plants.

It is another object of the present invention to provide a composition that simultaneously induces roots in cuttings to produce new plants and infects the new plants with beneficial symbiotic fungi.

It is another object of the present invention to provide improved plant growth by increasing yields, enhancing quality of produce, resisting disease, and resisting pest and insects.

It is another object of the present invention to promote root initiation.

It is another object of the present invention to protect the cuttings from pathogens while also benefitting the plant through the antibacterial and anti-fungal properties of the honey.

In order to achieve one or more objects, the present invention provides a honey-based rooting gel composition. The honey-based rooting gel composition is an eco-friendly and unique rooting gel. The composition comprises one or more non-toxic ingredients. The one or more non-toxic ingredients include, but not limited to, honey, symbiotic fungi, plant rooting hormone, and natural rooting substances. In one example, the composition comprises one unit of honey, one or more units of symbiotic fungi and either one unit of plant rooting hormone or one unit of natural rooting substances.

The honey-based rooting gel composition simultaneously induces root formation and establishes beneficial symbiosis with one or more beneficial symbiotic fungi. The honey-based rooting gel composition simultaneously induces root formation and establishes beneficial symbiosis. The honey-based rooting gel composition simultaneously induces roots in cuttings to produce new plants and infects the new plants with beneficial symbiotic fungi. The symbiotic fungi improve various properties of the growing plants including, but are not limited to, increased yields, quality of produce, resistance to disease, resistance to insect pests, and general plant health.

In one aspect, the present invention discloses a method of promoting root formation in cuttings of plants, which comprises applying the composition having one or more non-toxic ingredients including honey, symbiotic fungus, and may also contain a plant rooting hormone or a natural rooting substance, thereby simultaneously inducing root formation and establishing beneficial symbiosis with one or more beneficial symbiotic fungi.

In one aspect, the present invention discloses a method of preparing the honey-based rooting gel for enhancing root growth. In one embodiment, the method provides a unique and non-toxic honey-based rooting gel composition.

In one advantageous feature of the present invention, the honey-based rooting gel not only induces roots in cuttings to produce new plants but also simultaneously infects the new plants with beneficial symbiotic fungi that can improve many properties of the growing plants including, but not limited to, increased yields, quality of produce, disease resistance, resistance to insect pests, and general health. The honey as the basis for the composition creates a synergy with the other all-natural ingredients for protecting the cuttings from pathogens and benefitting the plant through the antibacterial and anti-fungal properties of the honey. Further, the honey facilitates the infection of the new plant by beneficial fungi by acting as a carrier for the fungal spores. The honey also benefits fungal growth by providing growth-promoting carbohydrates (mainly fructose and glucose) for the germinating fungal spores. The honey is naturally antibacterial, which is beneficial for the proper growth of the plant root. As honey is used as a rooting gel in general, the honey-based rooting gel composition is used as a carrier for the simultaneous inoculation of the new plant with beneficial fungi that establish a symbiosis for the entire plant's life.

In another advantageous feature of the present invention, the honey-based rooting gel provides an unexpected synergy configured to protect the cuttings from pathogens through the antibacterial and anti-fungal properties of the honey. The use of honey, rather than synthetic gels, provides benefits for both the plant and the fungus at the beginning of the interaction and promotes the establishment of a beneficial symbiosis that lasts for the entire life cycle of the plant.

In another advantageous feature of the present invention, the honey also benefits fungal growth by providing growth-promoting carbohydrates (mainly fructose and glucose) for the germinating fungal spores. This carbohydrate from the honey thereby facilitates a more rapid colonization of the new plant by the beneficial fungus. This synergy between the honey and the fungus is not seen with synthetic gels that are chemically inert.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
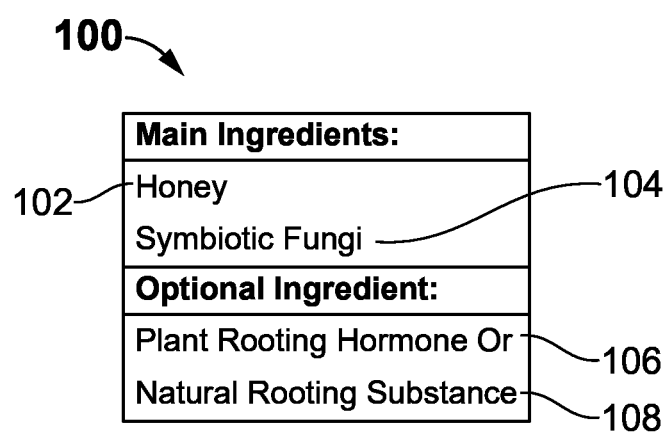
FIG. 1 illustrates a table having various ingredients of a honey-based rooting gel composition, according to one embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

At the outset, it should be clearly understood that like reference numerals are intended to identify the same structural elements, portions, or surfaces consistently throughout the several drawing figures, as may be further described or explained by the entire written specification of which this detailed description is an integral part.

Referring to FIG. 1, a composition table 100 shows main ingredients that contains honey and symbiotic fungus, and optional one or more non-toxic ingredients that includes either a plant rooting hormone, or a natural rooting substance, used in the manufacturing of a honey-based rooting gel composition (hereinafter referred to as "composition"), in accordance with one embodiment of the present invention. The composition is an eco-friendly and unique rooting gel. The composition simultaneously induces root formation and establishes beneficial symbiosis with one or more beneficial symbiotic fungi. The composition promotes root cell development. In one embodiment, the composition further promotes root initiation.

In one embodiment, the composition comprises honey 102 and symbiotic fungi 104, combined with one or more non-toxic ingredients. The one or more non-toxic ingredients are plant rooting hormone 106 and natural rooting substances 108. In one embodiment, the composition comprises one unit of honey 102, one or more units of symbiotic fungi 104, and either one unit of plant rooting hormone 106 or one unit of natural rooting substances 108. In one embodiment, honey 102 is organic honey. In one embodiment, symbiotic fungi 104 includes *Beauveria bassiana* or *Trichoderma koningii*. In one embodiment, the plant rooting hormones 106 include Indole-3-butyric acid (IBA) or other plant hormones. Although the root initiation often occurs naturally without the addition of root-promoting compounds, the composition may also contain rooting hormones 106, such as IBA, for example. In one embodiment, the natural rooting substances 108 includes willow bark extracts.

In one embodiment, the composition simultaneously induces root formation and establishes beneficial symbiosis. In another embodiment, the composition simultaneously induces roots in cuttings to produce new plants and infects the new plants with beneficial symbiotic fungi 104. The symbiotic fungi 104 improve various properties of the growing plants including, but not limited to, increased yields, quality of produce, resistance to disease, resistance to insect pests, and general plant health. The enhancement of root growth occurs in various types of plants, such as woody plants, flowering plants, and food crops. In one embodiment, the composition protects the cuttings from pathogens. The composition benefits the plant through antibacterial and anti-fungal properties of the honey.

The use of honey 102 as the basis for the composition creates a synergy with the other all-natural ingredients for protecting the cuttings from pathogens and benefitting the plant through the antibacterial and anti-fungal properties of the honey 102. Simultaneously, the honey 102 facilitates the infection of the new plant by beneficial fungi by acting as a carrier for the fungal spores. Honey 102 also benefits fungal growth by providing growth-promoting carbohydrates (mainly fructose and glucose) for the germinating fungal spores. Honey 102 is naturally antibacterial, which is beneficial for proper growth of the plant root. As honey 102 is used as a rooting gel, the honey-based rooting gel composition is used as a carrier for the simultaneous inoculation of the new plant with beneficial fungi that establish a symbiosis for the entire plant's life.

Further, honey 102 provides an unexpected synergy as honey 102 helps to protect the cuttings from pathogens through the antibacterial and anti-fungal properties of the honey 102. Honey 102 serves to facilitate the infection of the new plant from beneficial fungi by acting as a carrier for the fungal spores. In one embodiment, the honey 102 also benefits both plant and fungal growth by providing growth-promoting carbohydrates (mainly fructose and glucose) for both the plant and the germinating fungal spores. These benefits are not present in synthetic gel-based rooting gels. The use of honey 102, rather than synthetic gels, provides benefits for both the plant and the fungus at the beginning of the interaction and promotes the establishment of a beneficial symbiosis that lasts for the entire life cycle of the plant. In this manner, honey 102 serves to facilitate the infection of the new plant with beneficial fungi by acting as a carrier for the fungal spores.

The composition includes one or more units of a symbiotic fungus 104, for example, *Beauveria bassiana* or *Trichoderma koningii*, which improves various properties of the growing plants. The symbiotic fungi 104 are beneficial microorganisms (often called "Biologicals" or "Biological Control Agents"). The beneficial microorganisms are increasingly used in the growing of plants, especially commercial grows. These beneficial microorganisms bring benefits to the whole plant. These beneficial symbiotic fungi 104 increase plant growth and health. In many cases, an early increase in root mass proceeds an increase in above-ground biomass. The symbiosis may have beneficial effects on many plant properties including, but are not limited to, yield, quality, resistance to fungal diseases, resilience to flooding and drought, resistance to insect pests, and toxin levels.

These natural symbiotic partnerships elevate the plants' natural ability to resist pathogens and seasonal stressors. With symbiotic fungi 104, such as *Beauveria bassiana*, the ability to resist these stressors may be due to several processes including induced systemic resistance (ISR), mycoparasitism, and antibiosis. During ISR, the symbiotic fungus 104 induces the plant to turn on its defenses to a small extent. This "priming" of the defenses enables the plant to better resist subsequent infection attempts by pathogens. During mycoparasitism, the symbiotic fungus 104 parasitizes the invading pathogen. This results in stopping the infection. During antibiosis, the symbiotic fungus 104 inhibits pathogens through the secretion of metabolites and proteins, and simple competition. This competition can be for nutrients, or for space within the plant where the symbiotic fungus inhibits pathogen growth as a result of there being no space within the plant for proper pathogen growth.

In one embodiment, the plant rooting hormone 106 may be a synthetic root-promoting compound, for example, Indole-3-butyric acid (IBA). The synthetic root-promoting compound in the composition is a one-and-done technology, which facilitates both production and protection of clones in a single step at the beginning of the plant's life cycle and employs one or more species of symbiotic fungus 104. In one embodiment, the natural rooting substance 108 is efficacious for promoting root growth.

In one embodiment, a method of promoting root formation in cuttings of plants includes honey 102 and symbiotic fungi 104, combined with one or more non-toxic ingredients that includes either a plant rooting hormone 106, or a natural rooting substance 108, thereby simultaneously inducing root formation and establishing beneficial symbiosis with one or more beneficial symbiotic fungi.

Figure 2:
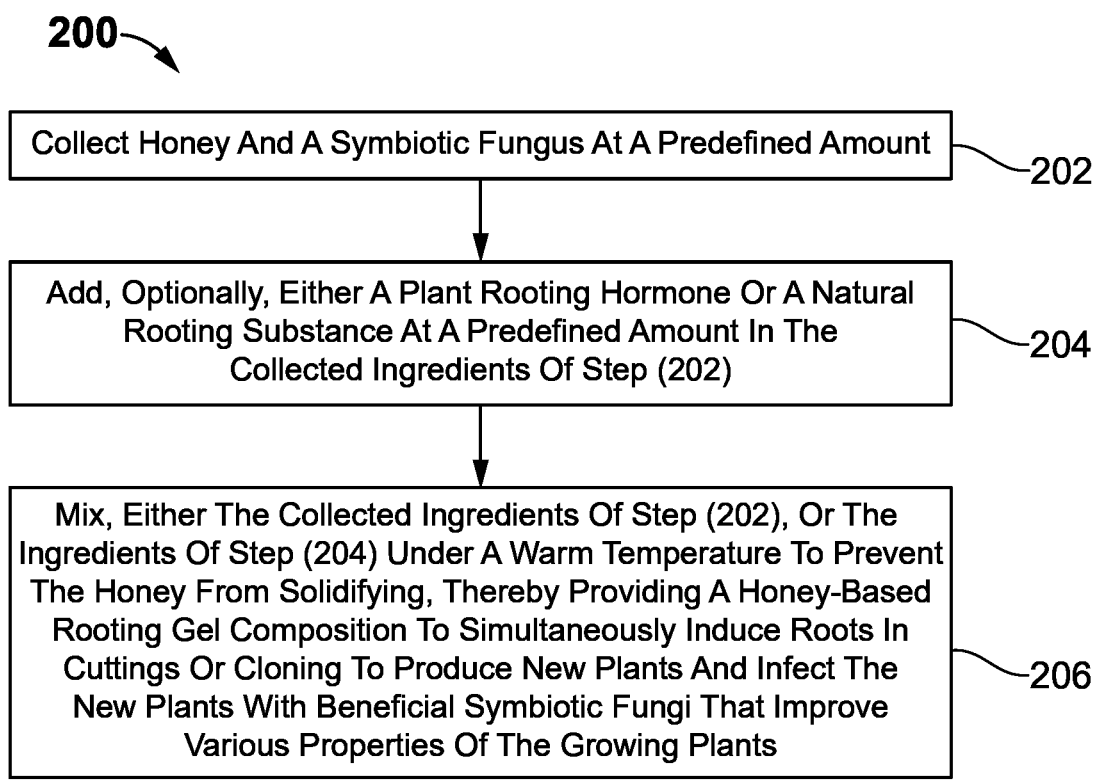
FIG. 2 illustrates a method for manufacturing the honey-based rooting gel composition, according to one embodiment of the present invention.

Referring to FIG. 2, a method 200 of preparing the honey-based rooting gel for enhancing root growth, in accordance with one embodiment of the present invention. Method 200 simultaneously induces roots in cuttings to produce new plants and infects the new plants with beneficial symbiotic fungi 104. The beneficial symbiotic fungi 104 have beneficial effects to increase yields, quality of produce, resistance to disease, resistance to insect pests, plant health, and biomass for the plant's entire life. This one-and-done technology facilitates both production and protection in a single step at the beginning of the plant's life cycle and uses one or more species of symbiotic fungus 104.

In one embodiment, the method 200 provides a unique honey-based rooting gel composition for enhancing root growth. The method 200 of preparing the honey-based rooting gel composition comprises the following steps. At step 202, main ingredients such as, honey 102, and symbiotic fungus 104, are collected at a predefined amount. In step 204, optionally either a plant rooting hormone 106, or a natural rooting substance 108 are included in the collected main ingredient of step 202 at a predefined amount. In some embodiments, any volumes, weight percentages, moles, or other measurement units may be used for mixing the ingredients to prepare the composition. At step 206, the main ingredients of step 202 are mixed, or the ingredients of step 204 are mixed under a warm temperature to prevent the honey from solidifying.

Advantageously, the composition of the present invention is a unique honey-based rooting gel composition. The composition is inexpensive and eco-friendly. The composition promotes root initiation. Also, the composition promotes root cell development. The honey in the composition creates an unexpected synergy with the other all-natural ingredients for protecting the cuttings from pathogens and benefitting the plant through the antibacterial and anti-fungal properties of the honey. The use of honey rather than synthetic gels also provides benefits for both the plant and the fungus at the beginning of the interaction by providing carbohydrates that promote the establishment of the beneficial symbiosis that lasts for the entire life cycle of the plant.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A honey-based rooting gel composition for enhancing growth in plant material lacking roots, comprising:
   one unit of honey and one or more units of a symbiotic fungus having a concentration in the range of $1 \times 10^3$ CFU/ml and CFU/ml is $1 \times 10^{15}$, combined with one unit or one or more non-toxic ingredients selected from a group consisting of a plant rooting hormone and a natural rooting substance, thereby the honey-based rooting gel composition is capable of simultaneously inducing root formation and establishing a beneficial symbiosis with one or more beneficial symbiotic fungi, wherein the symbiotic fungus is *Beauveria bassiana* or *Trichoderma koningii* that increase plant growth and health.

2. The honey-based rooting gel composition of claim 1, wherein the honey comprises organic honey that acts as a gel.

3. The honey-based rooting gel composition of claim 1, wherein the plant rooting hormone comprises Indole-3-butyric acid (IBA) for promoting root initiation.

4. The honey-based rooting gel composition of claim 1, wherein the natural rooting substance is willow bark extracts for promoting root growth.

5. A method of promoting root formation in cuttings or cloning of plant comprising: applying honey-based rooting gel composition of claim 1 to a plant material lacking roots.

6. A method for preparing the honey-based rooting gel composition of claim 1 for enhancing root growth, the method comprising the steps of:
   (a) collecting honey and a symbiotic fungus at a predefined amount,
   (b) adding, optionally, either a plant rooting hormone or a natural rooting substance at a predefined amount in the collected ingredients of step (a); and
   (c) mixing either the collected ingredients of step (a), or the ingredients of step (b) under a warm temperature to prevent the honey from solidifying, thereby providing a honey-based rooting gel composition to simultaneously induce roots in cuttings or cloning to produce new plants and infect the new plants with beneficial symbiotic fungi that improve various properties of the growing plants.

\* \* \* \* \*